United States Patent [19]

Chu

[11] Patent Number: 4,918,783
[45] Date of Patent: Apr. 24, 1990

[54] ADJUSTABLE WHEEL STRUCTURE

[76] Inventor: Jack Chu, No. 1-67, Wen Long Ts'un, Ming Hsiung Hsiang, Chiayi Hsien, Taiwan

[21] Appl. No.: 352,449

[22] Filed: May 16, 1989

[51] Int. Cl.⁵ .............................................. B60B 33/04
[52] U.S. Cl. .......................................... 16/19; 16/32; 280/43.17; 280/43.20
[58] Field of Search ................... 16/19, 32; 280/43.17, 280/43.20, 43.24

[56] References Cited

FOREIGN PATENT DOCUMENTS 583024  9/1959  Canada ..................................... 16/19
252004 12/1985  Japan ...................................... 16/32

Primary Examiner—Nicholas P. Godici
Assistant Examiner—Edward Brown
Attorney, Agent, or Firm—Browdy and Neimark

[57] ABSTRACT

An improved adjustable wheel structure mainly adapted for use in a trailing vehicle on which a yacht, boat or motorcycle can be mounted for transportation; the present wheel structure is provided with a special nut member having its inner surface half threaded and half smoothed, and the nut member is able to be adjusted forward or backward so that the threaded inner surface thereof can be selectively engaged with a vertically disposed adjusting screw rod which has a smaller diameter than the central through hole of the slidable nut member so that the wheel structure can be smoothly adjusted in height; as the threaded side of the nut member is adjusted to disengage from the screw rod with the smoothed side thereof in contact with the adjusting screw rod, the wheel structure can be adjusted quickly rather than in stepwise manner.

4 Claims, 4 Drawing Sheets

ADJUSTABLE WHEEL STRUCTURE

FIELD OF THE INVENTION

The present invention relates to an improved adjustable wheel structure adapted mainly for use in a trailing vehicle wherein a specially modified slidable nut member, the inner surface thereof being half threaded and half smoothed, is used to selectively engage with an adjusting screw rod so that the height of the wheel structure can be either slowly or quickly adjusted.

As shown in FIG. 1., a conventional adjustable wheel structure has an outer tube 1, the top end of which is defined to have a number of faceted portions 10 with a pair of liners 12 fixed thereto which is used to support a hand operated shaft 11 in place, extending through the outer tube 1. The end of the shaft, extended out of the outer tube 1, is attached with a washer 13 as well as a C-shaped clip 14 for fixing purpose; and the other end thereof disposed in the interior of the outer tube is provided with a thrust bearing 15 with a first bevel gear 16 attached on the outer side thereof.

An adjusting screw rod 2 is fixed in place at the bottom of the faceted portions of the outer tube 1 by a first restraint plate 20 and a second restraint plate 23 with the thrust bearing 21 disposed therebetween. The top end of the screw rod 2 extended beyond the first restraint plate 20 is engaged with a pin 19 extending therethrough; and a second bevel gear 17 having a concaved bottom side 18 is placed at the topmost end of the screw rod.

In the outer tube 1 is inserted an inner tube 25, at the top end thereof is defined a recessed groove 26 and concaves 27 and 28 for fixing a nut member 24 which is engaged with the screw rod 2. At the bottom of the inner tube 25 is secured a wheel supporting frame 29 to which a wheel 291 is operatively fixed by means of a shaft 290, thereby the conventional wheel structure is constituted.

By actuation of a handle to rotate the shaft 11 as well as the first bevel gear 16 mounted thereon, the second bevel gear 17 is accordingly spinned. The screw rod 2 engaged with the bevel gear 17 by the pin 19 disposed in the groove 18 at the bottom of the gear is actuated to rotate accordingly. In the meanwhile, the nut member 24 secured at the top of the inner tube 25 is engaged with the screw rod 2 so that the inner tube 1 is able to be lifted or lowered as a result of rotation of the shaft 11.

It can be clearly seen that the adjustment of the height of the wheel structure is effected only by way of the actuation of the hand operated shaft 11. It is time and labor consuming in case of large-scale adjustment.

SUMMARY OF THE INVENTION

Therefore, the primary object of the present invention is to provide an improved adjustable wheel structure which can be fast or slowly operated to make the adjustment of the height of the wheel.

One other object of the present invention is to provide an improved adjustable wheel structure wherein a slidable nut member having an oval shaped central through hole which is half threaded and half smoothed in the inner surface thereof; and the nut member is able to be adjustably moved forward or backward so that it can be selectively engaged with an adjusting screw rod and disengaged therefrom by making the threaded side of the inner surface in abutment with the screw rod or the smoothed side thereof in contact with the screw rod. Thereby, the wheel structure can be either slowly or quickly adjusted in practical operation.

Another object of the present invention is to provide an improved wheel structure wherein the outer tube is provided with a large oblong opening on one side thereof, and a threaded hole is disposed on the corresponding side of the inner tube so that an adjusting bolt member placed therethrough and having the inner end thereof engaged with a nut member by a pin element can effect the control of the sliding movement of the nut member.

One further other object of the present invention is to provide an improved wheel structure wherein a spring element is disposed on the other side of the nut member so as to facilitate the adjustment of the nut member.

One further object of the present invention is to provide an improved wheel structure wherein a resilient plate is bendably disposed along with a semi-circular board extended through the nut member and having one edge thereof provided with threads which can selectively engage with the screw rod in operation so that the screw rod can operate in a more steady manner.

One still further object of the present invention is to provide an improved wheel structure wherein the bottom end of the screw rod is defined in a round-cornered manner with a slide block attached thereto so as to make the operation of the screw rod in a stable and smooth manner.

DETAILED DESCRIPTION OF PREFERRED EMBODIMENTS

Figure 1:
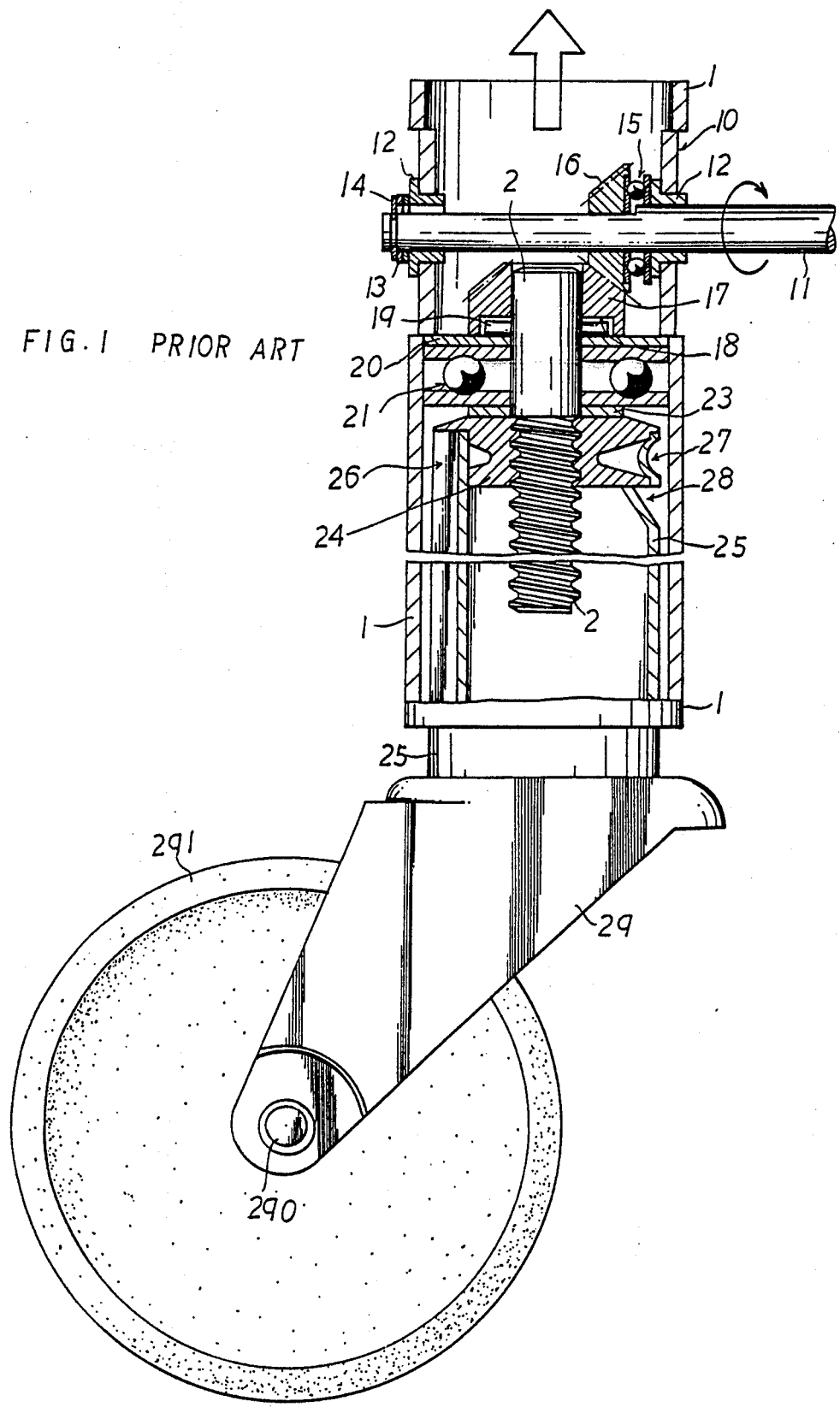
FIG. 1 is a cross sectional view of the prior art adjustable wheel structure.
Figure 2:
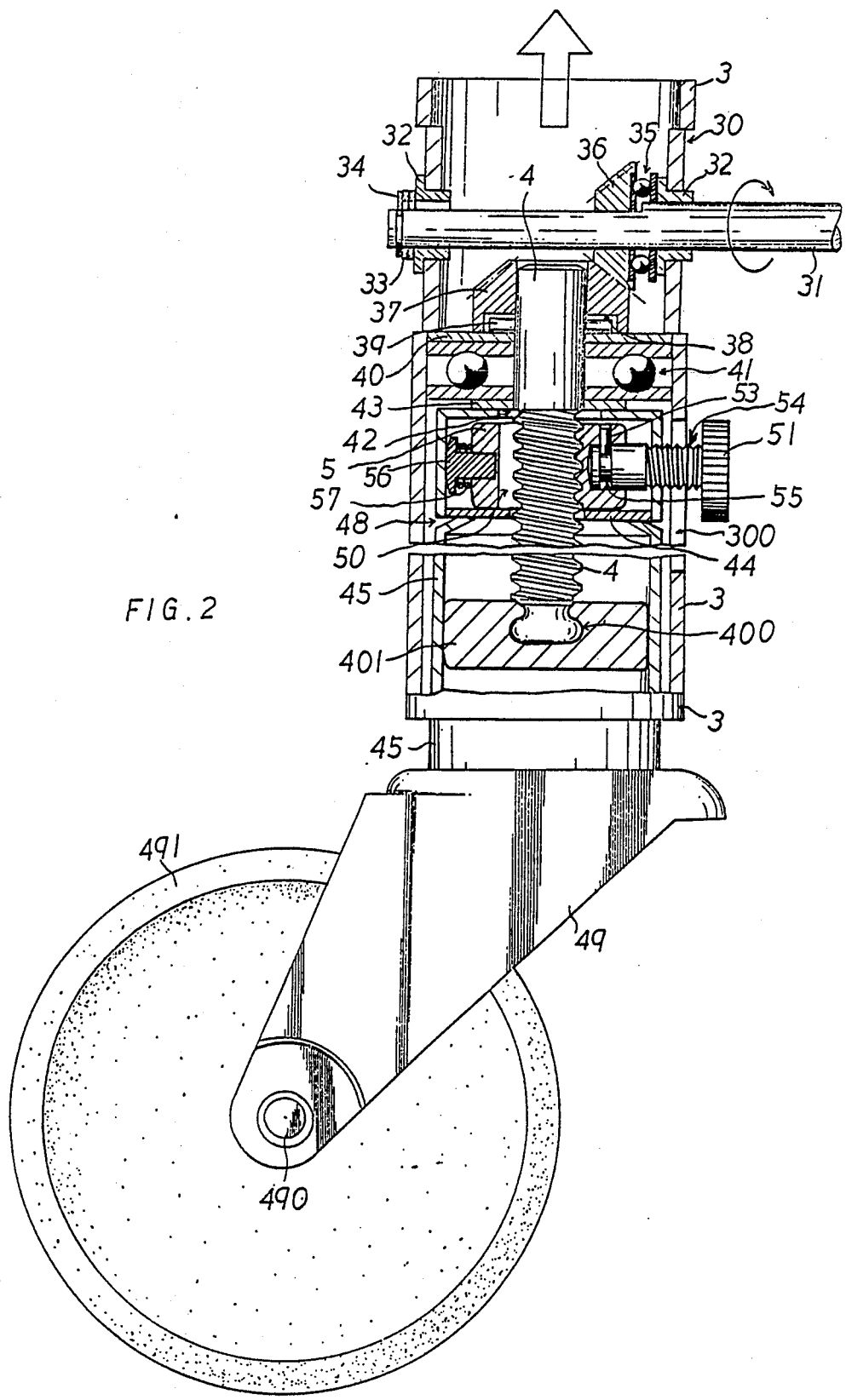
FIG. 2 is a cross sectional view of the present invention.

Referring to FIG. 2, the outer tube 3 is provided with a number of faceted portions 30 near the top end thereof; a pair of symmetric liners 32 are associated with the outer tube 3 so that a hand operated shaft 31 going through the wall and the interior of the outer tube 3, and the other end of the shaft 31 is fixed in place by means of a C-shaped clip 34 and a thrust bearing 35 which is provided with a first bevel gear 36 at one side thereof.

At the bottom of the faceted portions 30 of the outer tube 3 are disposed an upper supporting plate 40 and a lower supporting plate 43 with a thrust bearing 41 disposed therebetween, thereby an adjusting screw rod 4 can be operatively located in place. The top end of the screw rod 4 is provided with a pin element 39 transversely disposed therethrough; and a second bevel gear 37 is attached to the topmost end of the screw rod 4 with a concaved portion 38 defined at the bottom thereof so that the pin element 39 can be placed thereunder. The first bevel gear 36 in engagement with the second bevel gear 37 is mounted on the hand operated shaft 31 and located within the outer tube 3.

An inner tube 45 is disposed in the interior of the outer tube 3 with a nut member 5 secured on the top end thereof and a wheel frame 49 attached at the bottom end thereof, and a wheel 491 is rotatably fixed on the wheel frame 49 by means of a shaft 490.

The bottom end of the screw rod 4 has a round-cornered portion 400 with a slide block 401 attached thereto, which is in slidable contact with the inner wall of the inner tube 45 so as to make the movement of the screw rod stable and smooth.

Figure 3:
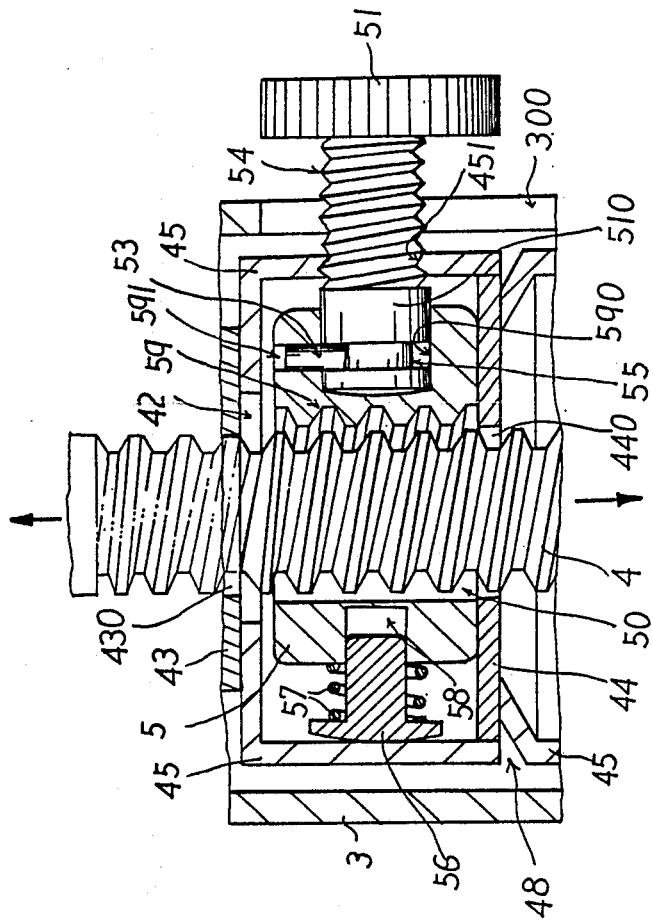
FIG. 3 is a cross sectional view of the special nut member of the present invention.

The inner tube 45 has a closed top end with a hole 42, slightly larger than the screw rod 4, disposed thereat so as to permit the passage of the rod. Near the closed top end of the inner tube 45 and on the wall thereof is provided a peripheral recess 48 producing inward protrusion on the inner wall of the inner tube 45 so as to support a supporting board 44 having a central through hole 440 disposed thereon so that a chamber is formed to house the nut member 5 in the upper portion of the inner tube 45; the supporting board 44 is in abutment with the inward protruding edge of the peripheral recess 48, as shown in FIG. 3.

The slidable nut member 5 is provided with an oval-shaped through hole 50, the right half of the inner surface thereof being threaded and the opposite half thereof being smoothed in surface. The right half wall of said nut member 5 with a plurality of threads 59 disposed thereon is provided with a horizontal burrow 590. A vertical pin hole 591 is made on the wall of the nut member 5 and in communication with the horizontal burrow 590. On the wall of the inner tube 45 and outer tube 3, at the collinear positions with respect to the horizontal burrow 59, are provided through holes 451 and 300 respectively. An adjusting bolt member 51 is screwed into the holes 451, 300 and the burrow 590. The bolt member 51 has a peripheral groove 55 defined at the front end 510 thereof which is located in the burrow 590 with a pin element 53 in engagement with the peripheral groove 55 so that the special nut member 5 can be operatively associated with the bolt member 51. Thus, the special nut member 5 is able to slide on the supporting board 44 in back and forth manner as a result of corresponding actuation of the adjusting bolt member 51 having threads 54 engaged with threaded hole 451, 300. Once the nut member 5 is moved to such a position that the threads 59 thereof are engaged with the screw rod 4, the same can be adjusted gradually by rotation of the hand-operated shaft 11. As the nut member 5 is moved in the opposite direction, to such a position that the smoothed portion thereof comes in contact with the screw rod 4, thereby the screw rod is free of the restraint of the nut member and can be quickly adjusted. The hole 300 disposed on the outer tube 3 is defined large enough to permit the bolt member 51 to move in vertical direction in adjustment.

To make the slidable nut member 5 resiliently operated a couple of approaches are adopted. As shown in FIG. 3, in the first approach, a spring element 57 mounted to a fixing member 56 is disposed in the chamber and in abutment with the left side of the nut member 5. To locate the fixing member 56 in place, a horizontal hole 58 is disposed on the leftside wall of the nut member 5. Thus, the nut member 5 can be more readily actuated in operation.

Figure 4:
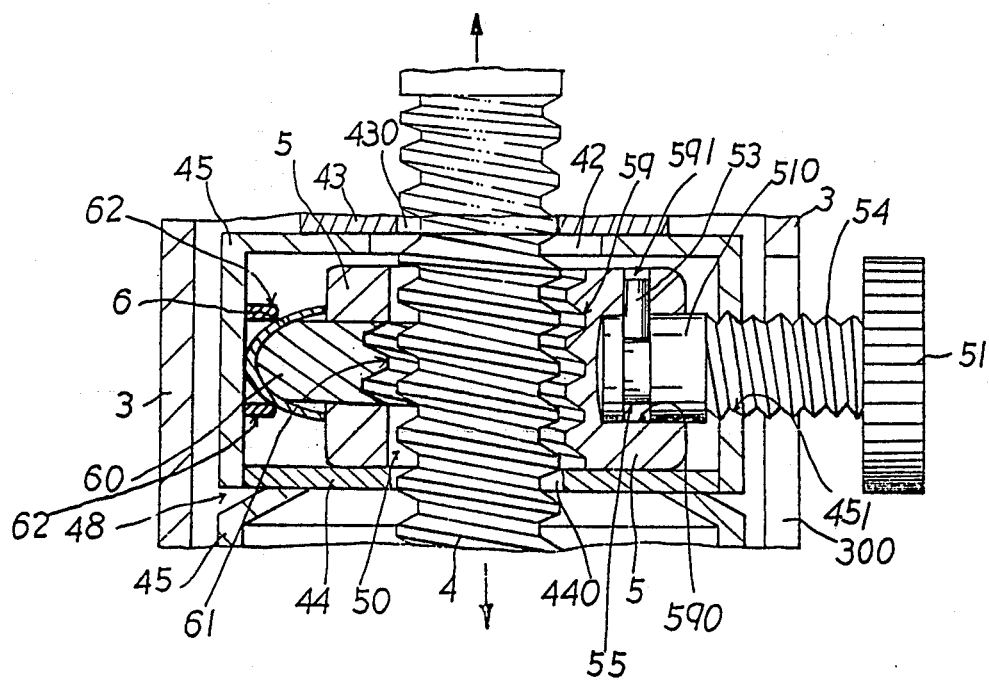
FIG. 4 is one of the embodiments of the present invention with a spring actuated nut member.
Figure 5:
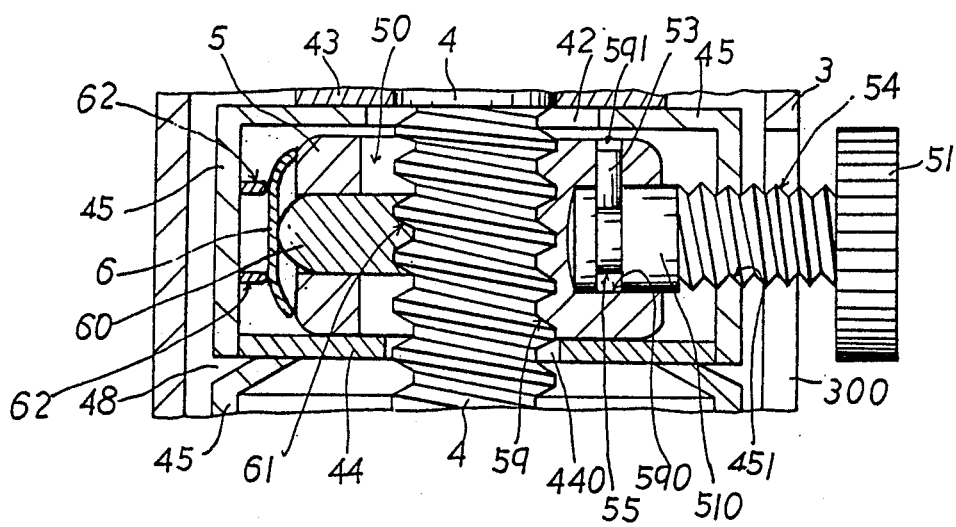
FIG. 5 is the other embodiment of the present invention with a bent resilient plate actuated nut member having an extra semi-circular slide board engaged therewith.

Furthermore, in the second approach, a resilient plate 6 with a semi-circular slide board 60 welded thereto is bent in form and provided with threads 61 along the front curvilinear periphery of the board. To permit the semi-circular slide board 60 in abutment with the screw rod 4, a horizontal slot is disposed on the wall of the smoothed portion of the nut member 5. On the inner wall of the inner tube 45, at corresponding position of the resilient plate 6 and the semi-circular board 60, a pair of protrusion rods 62 are disposed in such a manner that the bent resilient plate 6 is able to fit therebetween in normal condition. As shown in FIG. 4, when the nut member 5 is put in a non-operative position, the semi-circular board 60 is pulled away from the screw rod 4 by the bent resilient plate 6 which is confined in between the protrusion rods 62. Referring to FIG. 5, as the adjusting bolt member 51 is actuated to push the nut member 5 to engage with the screw rod 4 with its threaded portion, the edges of the bent resilient plate 6 are accordingly backward urged against the protrusion rod and extended into flat form, pushing the semi-circular board 60 forward to engage with the screw rods with its threaded edge so that the screw rod 4 can operate in a more stable and smooth manner.

From the preceeding description, it can be clearly shown that the present invention employs a slidable nut member 5 which is adjustable of its location by means of an adjusting bolt member 51 so that the half threaded inner surface 59 of the nut member 5 can be selectively engaged with a screw rod 4. By actuation of a hand operated shaft 31, the screw rod 4 can effect slow adjustment of the wheel structure or effect fast adjustment thereof as soon as the nut member 5 is engaged with the screw rod 4 with its other half smoothed inner surface. To make the adjustment of the present invention more stable and smooth, an extra semi-circular board 60 provided with threads along its front curvilinear edge is able to be selectively engaged with or disengaged from the screw rod 4 with the help of a bent resilient plate 6.

I claim:

1. An improved adjustable wheel structure adapted for use in
    a trailing vehicle comprising: an outer tube having a number of facets disposed at the top end thereof with a hand operated shaft being horizontally guided through the faceted portion, and a first bevel gear means being mounted to the shaft and located within said outer tube;
    an inner tube disposed within said outer tube and having a closed top end which is provided with a hole so that a screw rod can be located therethrough; on the top portion of said inner tube being provided with a peripheral recess which defines an inward protrusion in said inner tube, thereby a supporting board having a central hole disposed thereon can be supported in place so as to form a chamber near the top portion of said inner tube;
    a slidable nut member housed in said chamber at the top portion of said inner tube, having an oval-shaped through hole with said screw rod going therethrough; the surface of said oval-shaped hole being half threaded and half smoothed; a vertical hole being disposed on an upper wall of said nut member, in communication with a horizontal burrow horizontally disposed on a side wall of said nut member;
    an adjusting bolt member having a peripheral groove disposed at the front end thereof being led through holes on the outer tube and inner tube and into said horizontal burrow with a pin element located in said vertical hole and engaged with said peripheral groove so as to operatively join said nut member and bolt member together;

the top end of said screw rod being provided with a second bevel gear engaged with said first bevel gear mounted on said shaft;

the hole on said outer tube, through which said adjusting bolt member is guided, being large enough to permit the bolt member to move upward or downward in adjustment along with the nut member in said inner tube; whereby the actuation of said adjusting bolt member can move said nut member inward or outward so as to keep the half threaded inner surface of said nut member engaged with or disengaged from said screw rod where the other half smoothed inner surface is in contact with said screw rod allowing the wheel structure to be adjusted in slow or fast manner.

2. An improved adjustable wheel structure as claimed in claim 1 wherein said nut member is provided with a spring means disposed on the other half side of said adjusting bolt member in said chamber with said spring means mounted on a fixing member which is disposed with its front end in a horizontal hole defined on the vertical outer wall of the other half of said slidable nut member so that said nut member can be resiliently actuated to move in the direction that said adjusting bolt member is rotated.

3. An improved adjustable wheel structure as claimed in claim 1 wherein said slidable nut member is provided with a horizontal through slot on the other half vertical outer left wall so that a semi-circular board can be disposed therein; said semi-circular board has a curvilinear threaded front periphery which is able to be selectively engaged with said screw rod, a resilient plate defined in bent form is associated with said semi-circular board by welding and is confined in place between a pair of protrusion rods disposed on wall of said chamber so that the semi-circular board can be pushed away from said wall to engage with said screw rod or disengage therefrom by actuation of said nut member against said bent resilient plate.

4. An improved adjustable wheel structure as claimed in claim 1 wherein said screw rod is provided with a round cornered bottom end to which a slide block is secured, said slide block is placed in slidable abutment with the inner wall of said inner tube so as to make the operation of said screw rod more stable.

* * * * *